(12) United States Patent
Nozawa et al.

(10) Patent No.: US 8,760,420 B2
(45) Date of Patent: Jun. 24, 2014

(54) MOBILE ELECTRONIC DEVICE, METHOD FOR SWITCHING OPERATING MODES, AND RECORDING MEDIUM

(75) Inventors: Tomoyasu Nozawa, Kanagawa (JP); Masaki Uesugi, Kanagawa (JP); Seitaro Majima, Kanagawa (JP); Tatsuo Katayama, Saitama (JP); Shigeru Katayama, legal representative, Saitama (JP)

(73) Assignee: Nec Casio Mobile Communications, Ltd., Kawasaki-Shi, Kanagawa (JP)

( * ) Notice: Subject to any disclaimer, the term of this patent is extended or adjusted under 35 U.S.C. 154(b) by 590 days.

(21) Appl. No.: 13/080,572

(22) Filed: Apr. 5, 2011

(65) Prior Publication Data

US 2011/0242035 A1 Oct. 6, 2011

(30) Foreign Application Priority Data

Apr. 6, 2010 (JP) ................................. 2010-088193

(51) Int. Cl.
*G06F 3/041* (2006.01)

(52) U.S. Cl.
USPC .......................................... 345/173; 345/169

(58) Field of Classification Search
CPC ......... G06F 3/02; G06F 3/0221; G06F 3/041; G06F 3/0208
USPC .......................................... 345/168, 169, 173
See application file for complete search history.

(56) References Cited

U.S. PATENT DOCUMENTS

| | | | | |
|---|---|---|---|---|
| 6,492,974 B1 * | 12/2002 | Nobuchi et al. | ............... | 345/168 |
| 8,300,022 B2 * | 10/2012 | Brenneman et al. | .......... | 345/173 |
| 2004/0227730 A1 * | 11/2004 | Sugihara | ....................... | 345/173 |

FOREIGN PATENT DOCUMENTS

| | | |
|---|---|---|
| JP | 2002-006988 A | 1/2001 |
| JP | 2005-228054 A | 8/2005 |
| JP | 2009-140471 A | 6/2009 |
| JP | 2010-34857 A | 2/2010 |

OTHER PUBLICATIONS

Notification of Reason(s) for Rejection dated Nov. 12, 2013, with English translation.

* cited by examiner

*Primary Examiner* — Regina Liang
(74) *Attorney, Agent, or Firm* — McGinn IP Law Group, PLLC

(57) ABSTRACT

A mobile phone handset includes a mode switching unit and a configuration detection sensor, so that the operating mode of the mobile phone handset can be switched. The mode switching unit has a switching program installed, and is a computer for executing a prescribed process in accordance with the switching program when a signal is input from the configuration detection sensor. The configuration detection sensor is a sensor for detecting the configuration of the mobile phone handset, and for example may use an angular sensor for detecting the relative angle about a rotation axis between a first casing and a second casing.

5 Claims, 7 Drawing Sheets

MOBILE ELECTRONIC DEVICE, METHOD FOR SWITCHING OPERATING MODES, AND RECORDING MEDIUM

INCORPORATION BY REFERENCE

This application claims the benefit of Japanese Patent Application No. 2010-088193 filed on Apr. 6, 2010. The disclosure of the above Japanese Patent Application is incorporated herein by reference in its entirety.

TECHNICAL FIELD

The present invention relates to a mobile electronic device, in particular a mobile electronic device equipped with a touch panel as an input apparatus, a method for switching operating modes for a mobile electronic device, and a recording medium recording an operating mode switching program for a mobile electronic device.

BACKGROUND ART

A so-called rear-surface operation-type mobile electronic device has been known. For example, Unexamined Japanese Patent Application KOKAI Publication No. 2002-6988 discloses a mobile handset in which an operation pad is arranged on the rear surface of a body of the mobile handset equipped with a liquid crystal display unit, and various operation input are accomplished by causing a cursor displayed on the liquid crystal display unit to move using the operation pad.

Such a rear-surface operation-type mobile electronic device does not require a keyboard and thus can be made more compact and lightweight. In addition, this kind of mobile electronic device is convenient for a user to carry and operate.

SUMMARY

A rear-surface operation-type mobile electronic device has adequate functionality with simple input operations, for example selecting the desired item from a menu displayed on the liquid crystal display unit. However, such devices are difficult to be used with more complex input operations, such as the operation of inputting a sentence. In such cases, input via a keyboard is more suitable.

In consideration of the foregoing, it is an exemplary object of the present invention to provide a mobile electronic device, a method for switching operating modes for the mobile electronic device, and a recording medium recording an operating mode switching program for the mobile electronic device, which can switch between one operating mode wherein operation input is accomplished via rear-surface operation and the other operating mode wherein the operation input is accomplished via a keyboard.

In order to achieve the above object, a mobile electronic device according to a first exemplary aspect of the present invention includes a first casing provided with a display panel, and a second casing provided with a touch panel; and wherein the first casing and the second casing are connected so as to be capable of moving relative to each other, such that a first configuration in which the display panel and the touch panel are in the same field of vision and a second configuration in which the touch panel is positioned at the rear surface of the display panel can be attained; and further including a mode switching unit for switching operating modes by determining whether the mobile electronic device is in the first configuration or the second configuration, and when the determinations result is the first configuration, selecting an operating mode that causes the touch panel to function as a keyboard, and when the determination result is the second configuration, selecting an operating mode that causes the touch panel to function as an operation input unit for rear-surface operation.

The touch panel may include a graphics display unit for displaying keyboard graphics; and the mode switching unit may cause the graphics display unit to operate when the determination result is the first configuration, and halt the graphics display unit when the determination result is the second configuration.

The graphics display unit may include a light-emitting unit; and the mode switching unit may control the operation and halting of the graphics display unit by controlling light emission and the halting of light emission from the light-emitting unit.

The mobile electronic device may include a configuration detection sensor for detecting information relating to the configuration of the mobile electronic device; such that the mode switching unit may determine the configuration on the basis of information detected by the configuration detection sensor.

The mode switching unit may cause the touch panel to function as an operation input unit for rear-surface operation when the mode switching unit determines that the mobile electronic device is in the second configuration, based on information detected by the configuration detection sensor.

A mobile electronic device according to a second exemplary aspect of the present invention includes a first casing provided with a display panel, and a second casing provided with a touch panel; and wherein the first casing and the second casing are connected so as to be capable of moving relative to each other, such that a first configuration in which the display panel and the touch panel are in the same field of vision and a second configuration in which the touch panel is positioned at the rear surface of the display panel can be attained; and further including a mode switching means for switching operating modes by determining whether the mobile electronic device is in the first configuration or the second configuration, and when the determinations result is the first configuration, selecting an operating mode that causes the touch panel to function as a keyboard, and when the determination result is the second configuration, selecting an operating mode that causes the touch panel to function as an operation input means for rear-surface operation.

A method according to a third exemplary aspect of the present invention is a method for switching operating modes for a mobile electronic device including a first casing provided with a display panel, and a second casing provided with a touch panel, and wherein the first casing and the second casing are connected so as to be capable of moving relative to each other, such that a first configuration in which the display panel and the touch panel are in the same field of vision and a second configuration in which the touch panel is positioned at the rear surface of the display panel can be attained; the operating mode switching method including: a determination step for determining whether the configuration of the mobile electronic device is the first configuration or the second configuration; and a mode switching step for switching the operating mode by selecting an operating mode that causes the touch panel to function as a keyboard when the result of the determination in the determination step is the first configuration, and selecting an operating mode that causes the touch panel to function as an operation input means for rear-surface operation when the result of the determination is the second configuration.

A recording medium according to a forth exemplary aspect of the present invention is a computer-readable recording medium recording an operating mode switching program for a mobile electronic device including a first casing provided with a display panel, and a second casing provided with a touch panel, and wherein the first casing and the second casing are connected so as to be capable of moving relative to each other, such that a first configuration in which the display panel and the touch panel are in the same field of vision and a second configuration in which the touch panel is positioned at the rear surface of the display panel can be attained; the program recorded on the recording medium executing on a computer: a determination step for determining whether the configuration of the mobile electronic device is the first configuration or the second configuration; and a mode switching step for switching the operating mode by selecting an operating mode that causes the touch panel to function as a keyboard when the result of the determination in the determination step is the first configuration, and selecting an operating mode that causes the touch panel to function as an operation input means for rear-surface operation when the result of the determination is the second configuration.

With the present invention, it is possible to provide a mobile electronic device, a method for switching operating modes for a mobile electronic device, and a recording medium recording an operating mode switching program for a mobile electronic device, which can switch between one operating mode wherein operation input is accomplished via rear-surface operation and the other operating mode wherein the operation input is accomplished via a keyboard.

BRIEF DESCRIPTION OF THE DRAWINGS

These objects and other objects and advantages of the present invention will become more apparent upon referring of the following detailed description and the accompanying drawings in which.

EXEMPLARY EMBODIMENT

An exemplary embodiment of the present invention is described below with reference to the drawings.

Figure 1A:
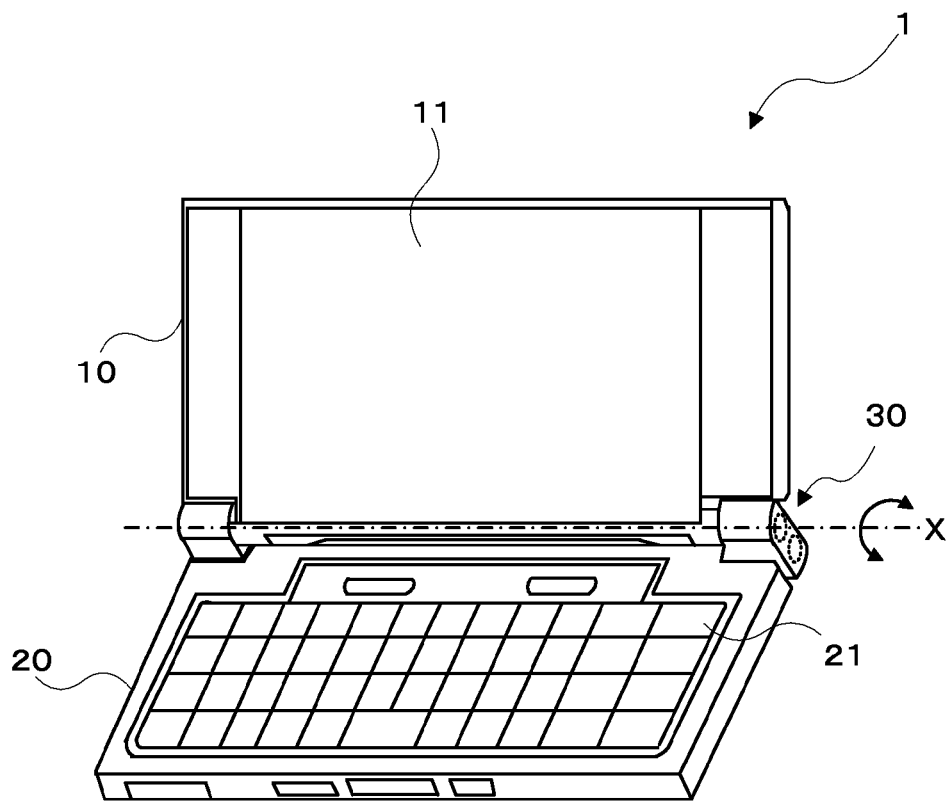
FIG. 1A is an oblique view showing the outline composition of a mobile phone handset in the first configuration according to an exemplary embodiment of the present invention.
Figure 1B:
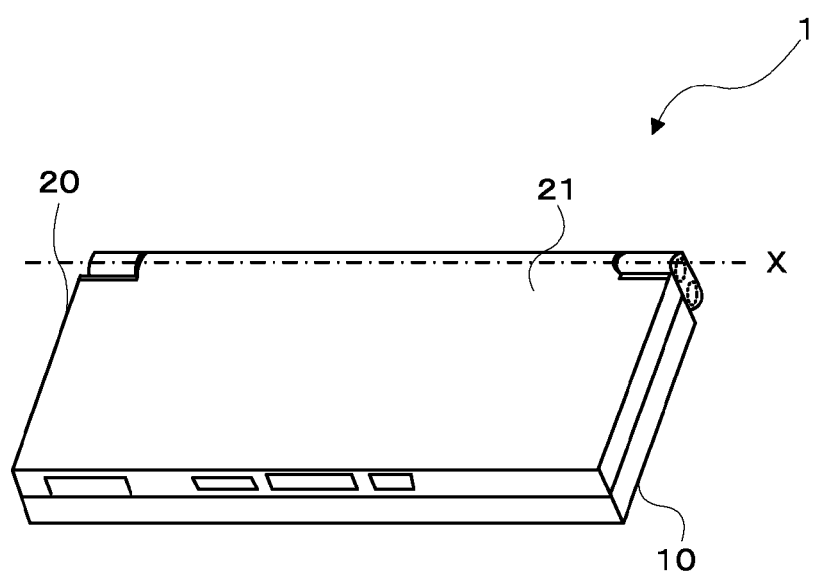
FIG. 1B is an oblique view showing the outline composition of a mobile phone handset in the second configuration according to an exemplary embodiment of the present invention.

A mobile phone handset 1 shown in FIG. 1A or 1B is an example of a mobile electronic device according to the exemplary embodiment of the present invention and is a so-called folding mobile phone handset. As shown in FIG. 1A, the mobile phone handset 1 includes a first casing 10 and a second casing 20 connected via a hinge 30, such that the first casing 10 and the second casing 20 can mutually rotate relative to each other about the axis of rotation indicated by X in FIG. 1A (hereafter called the "X axis").

By being provided with this kind of composition, the mobile phone handset 1 can attain a state (hereafter called the "first configuration") wherein a user can simultaneously see both a display panel 11 provided on the surface of the first casing 10 and a touch panel 21 provided in the second casing 20, by the first casing 10 and the second casing 20 mutually rotating relatively to each other about the X axis, as shown in FIG. 1A.

In addition, the mobile phone handset 1 can attain a state (hereafter called the "second configuration") wherein the first casing 10 that is above the second casing 20 in the first configuration is rotated about the X axis so that the first casing 10 overlaps below the second casing 20, as shown in FIG. 1B. At this time, the display panel 11 provided on the surface of the first casing 10 is not visible, being on the back side of the mobile phone handset 1. That is to say, the display panel 11 and the touch panel 21 are on the back surface of each other so that a user cannot simultaneously view the display panel 11 and the touch panel 21.

Figure 2:
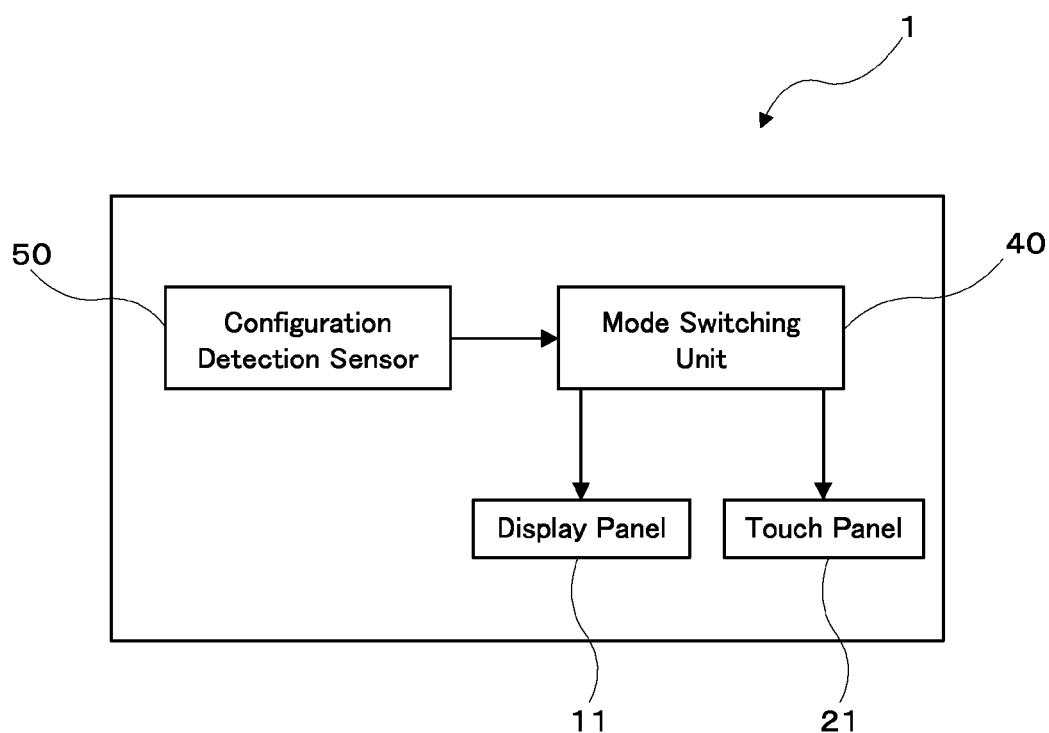
FIG. 2 is a block diagram showing the composition for switching operating modes in the mobile phone handset according to the exemplary embodiment.

The mobile phone handset 1 is provided with a mode switching unit 40 (or a mode switching means 40) and a configuration detection sensor 50 as shown in FIG. 2, which can switch the operating mode of the mobile phone handset 1.

The operating mode is a classification of the operating status of the display panel 11 and the touch panel 21. In the present exemplary embodiment, the state in which the display panel 11 and the touch panel 21 are both halted is called a first mode, and the state in which the display panel 11 operates and the touch panel 21 functions as a keyboard (a so-called software keyboard) is called a second mode. In addition, the state in which the display panel 11 operates and the touch panel 21 functions as a so-called operation input unit for rear-surface operation is called a third mode.

The mode switching unit 40 comprises a computer, for example. A below-described operating mode switching program 60 is installed in the mode switching unit 40. By executing the operating mode switching program 60, the mode switching unit 40 switches the operating mode of the display panel 11 and the touch panel 21 on the basis of signals input from the configuration detection sensor 50.

The configuration detection sensor 50 acquires information relating to the mutual positioning configuration of the display panel 11 and the touch panel 21 of the mobile phone handset 1. In the present exemplary embodiment, the configuration detection sensor 50 is an angular sensor that detects the relative angle (hereafter called the open angle) between the first casing 10 and the second casing 20 about the X axis. The configuration detection sensor 50 detects the open angle, may be equipped with a function that outputs a signal corresponding to the open angle, and is arbitrary in the type or the detection principle of the sensor. A commonly known sensor that can be acquired in the market can be appropriately and selectively used as the configuration detection sensor 50.

In the present exemplary embodiment, the open angle is defined as follows. The open angle when the display panel 11 and the touch panel 21 are facing each other on the inside with the first casing 10 and the second casing 20 folded and overlapping is defined as 0°, while the open angle of the state with the first casing 10 and the second casing 20 overlapping so that the display panel 11 and the touch panel 21 are the back surface of each other (see FIG. 1B), having passed through an open state (shown in FIG. 1A) by rotating the one with respect to the other of the first casing 10 and the second casing 20 about the X axis, is defined as 360°.

In the present exemplary embodiment, the configuration of the mobile phone handset 1 is classified in the following three ranges depending on the open angle. The range in which the open angle is at least 0° but less than 90° is a first range, the range from at least 90° to less than 180° is a second range, and the range exceeding 180° is a third range.

The conditions and process for switching the operating mode are described in the above-mentioned operating mode switching program 60. That is to say, switching of the operating mode is executed in accordance with the process stipulated in the operating mode switching program 60. Processing by the operating mode switching program 60 is explained below with reference to FIG. 3.

The operating mode switching program 60 starts when the main power supply of the mobile phone handset 1 is turned on.

(Step S1) The open angle θ detected by the configuration detection sensor 50 is received, and if the open angle θ is less than 90°, that is to say is in the first range (Step S1; Yes), the mode switching unit 40 advances to the process of step S2, while if the angle is 90° or greater (step S1; No), the mode switching unit 40 advances to the process of step S4.

(Step S2) The mode switching unit 40 halts the display panel 11 and advances to the process in step S3.

(Step S3) Next, the mode switching unit 40 halts the touch panel 21 and concludes the operating mode switching program 60.

(Step S4) The mode switching unit 40 causes the display panel 11 to operate and advances to the process in step S5.

(Step S5) Next, the mode switching unit 40 causes the touch panel 21 to operate and advances to the process in step S6.

(Step S6) If the open angle θ is less than 180°, that is to say is in the second range (step S6; Yes), the mode switching unit 40 advances to the process in step S7, while if the open angle θ is 180° or greater, in other words is in the third range (step S6; No), the mode switching unit 40 advances to step S8.

(Step S7) The mode switching unit 40 causes the touch panel 21 to function as a keyboard and concludes the operating mode switching program 60.

(Step S8) The mode switching unit 40 causes the touch panel 21 to function as an operation input unit for rear-surface operation and concludes the operating mode switching program 60.

Figure 3:
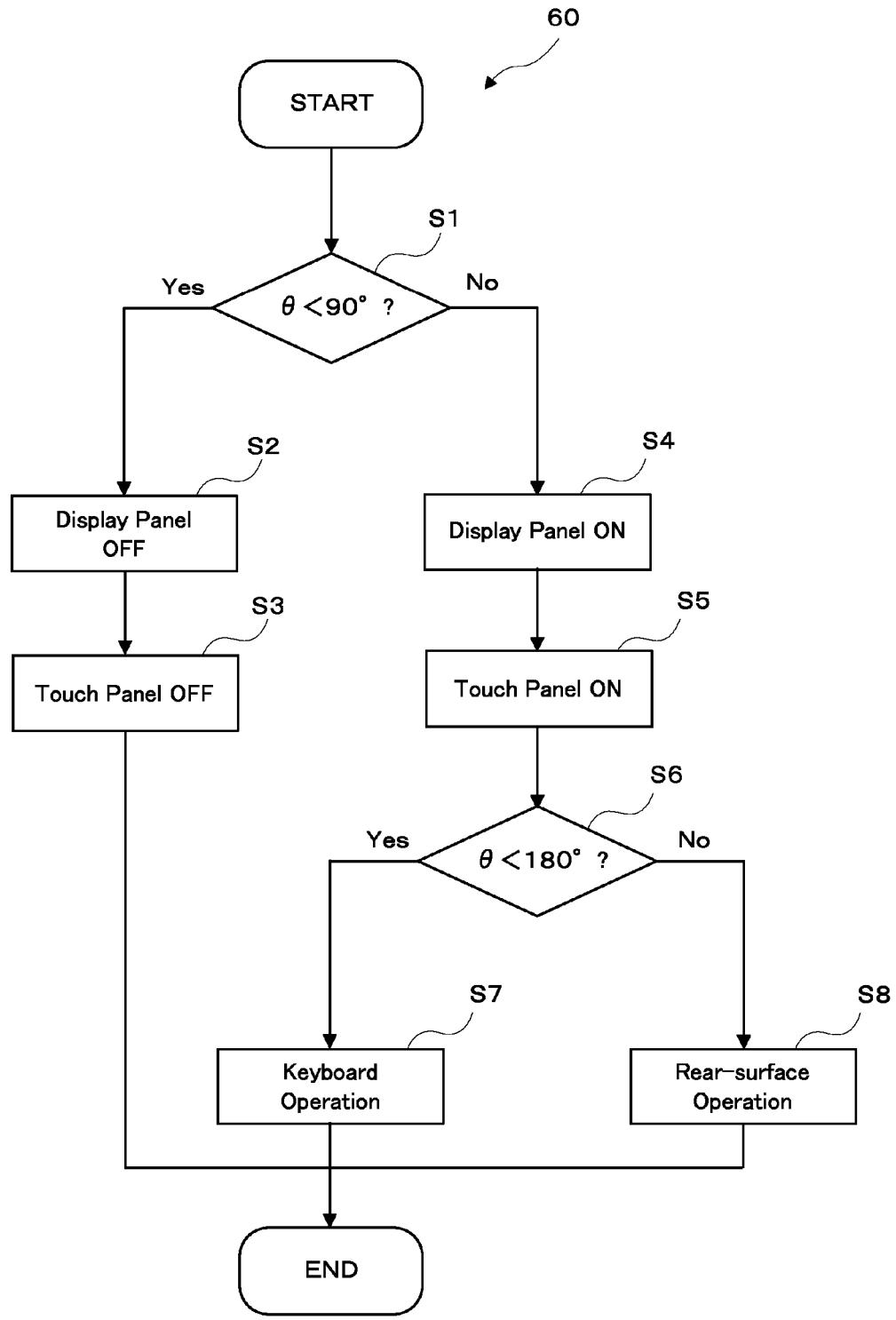
FIG. 3 is a flowchart showing the switching program for the mobile phone handset according to the exemplary embodiment.

The flowchart in FIG. 3 shows an operating mode switching method in addition to showing the contents of the operating mode switching program 60.

In this manner, the mobile phone handset 1 is such that the open angle between the first casing 10 and the second casing 20 is detected by the configuration detection sensor 50, and the mode switching unit 40 determines the configuration of the mobile phone handset 1 on the basis of the detected open angle and switches the operating mode on the basis of the determination result. That is to say, when the open angle is less than 90°, both the display panel 11 and the touch panel 21 are halted. When the open angle is at least 90° but less than 180°, in other words when the mobile phone handset 1 is in the first configuration (see FIG. 1A), the touch panel 21 functions as a so-called software keyboard. When the open angle is at least 180°, for example, when the mobile phone handset 1 is in the second configuration (see FIG. 1B), the touch panel 21 functions as an operation input unit for rear-surface operation.

Figure 4A:
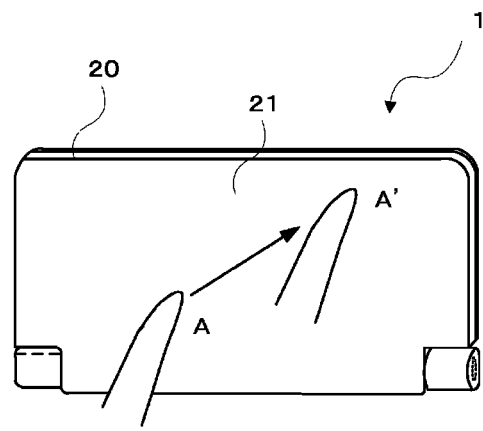
FIG. 4A is an oblique view of the mobile phone handset in the second configuration according to the exemplary embodiment as seen from the touch panel side.
Figure 4B:
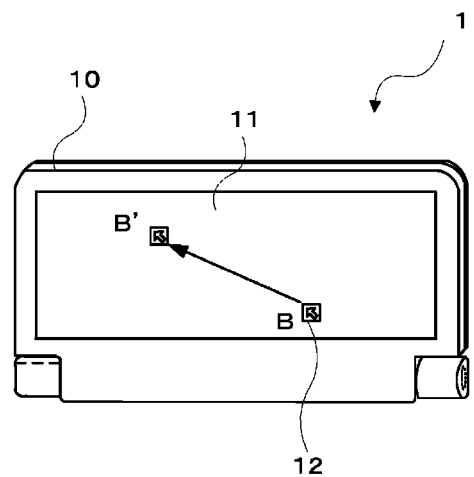
FIG. 4B is an oblique view of the mobile phone handset in the second configuration according to the exemplary embodiment as seen from the display panel side.

FIG. 4A is an oblique view of the mobile phone handset 1 in the second configuration as seen from the touch panel 21 side, and FIG. 4B is an oblique view of the mobile phone handset 1 in the second configuration as seen from the display panel 11 side.

At this time, the display panel 11 is arranged on the back surface of the touch panel 21, so that when a user operates the touch panel 21 while viewing the display panel 11, the touch panel 21 cannot be viewed by the user. The action of the display panel 11 and the touch panel 21 when the mobile phone handset 1 is in the second configuration is explained below with reference to FIGS. 4A and 4B.

As shown in FIG. 4A, when a user places a finger at a position A on the touch panel 21, the touch panel 21 detects that position and outputs a prescribed signal to a control apparatus (unrepresented). Upon receiving this signal, the control apparatus displays a pointer 12 at a position B (see FIG. 4B) on the display panel 11 corresponding to this position A. In addition, when the user moves the finger touching the touch panel 21 from position A to a position A' (see FIG. 4A), the pointer 12 on the display panel 11 moves from position B to a position B' (see FIG. 4B).

For example, icons can be displayed on the display panel 11, and it is possible to move the pointer 12 to the display position of a desired icon and to accomplish an operation such as selecting this desired icon. Or, it is possible to switch displays on the display panel 11 by moving the finger in a prescribed direction, much like turning a page. Or, the program may be such that the characters and figures displayed on the display panel 11 are enlarged or reduced by placing two fingers on the touch panel 21 and changing the distance between these fingers.

In this manner, when the user touches a finger to an arbitrary position or fingers to arbitrary two positions respectively on the touch panel 21 being on the rear surface of the display panel 11, operation input according to that position or positions and movement is accomplished, and when the results are displayed on the display panel 11, the touch panel 21 functions as an operation input unit for rear-surface operation.

Figure 5:
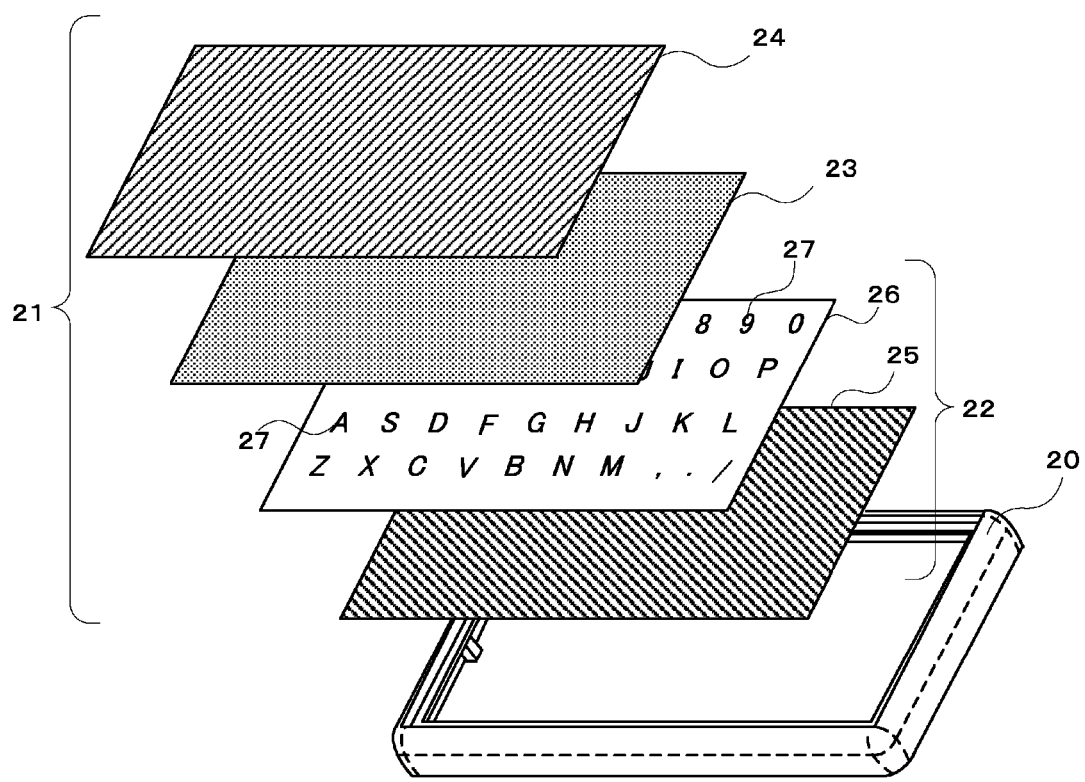
FIG. 5 is an oblique view of the composition of the touch panel of the mobile phone handset according to the exemplary embodiment.

As described above, when the mobile phone handset 1 is in the first configuration, graphics mimicking a keyboard and text corresponding to various keys (hereafter called "keyboard graphics") are displayed on the touch panel 21 to function as a so-called software keyboard. On the other hand, when the touch panel 21 functions as an operation input unit for rear-surface operation, this keyboard graphics are unnecessary. Consequently, the mobile phone handset 1 is provided with a function to halt the display of the keyboard graphics on the touch panel 21 when the touch panel 21 functions as an operation input unit for rear-surface operation. An exemplary composition of a touch panel 21 equipped with such a function is shown in FIG. 5. In this example, the touch panel 21 has a touch sensor 23 laminated on top of a graphics display unit 22 (or a graphic display means 22), with the top of the touch sensor 23 covered by a display panel 24.

The graphics display unit 22 is an apparatus for projecting and displaying the keyboard graphic on the surface of the display panel 24, and is composed of a light-emitting unit 25 (or a light emitting means 25) and a mask 26.

In the present exemplary embodiment, the light-emitting unit 25 is composed of a planar light-emitting element in which multiple LED (Light Emitting Diode) elements are arranged in a matrix shape on the panel surface. The type of the light-emitting unit and the light-emitting principle are not particularly limited.

The mask 26 is a light-blocking plate that prevents light emitted by the light-emitting unit 25 from going towards the touch sensor 23 and the display panel 24. In addition, a portion of the mask 26 is cut out in shapes corresponding to the keyboard graphics and a pervious unit 27 (or a pervious means 27) that transmits light is formed on the mask 26. In other words, a portion of the light emitted by the light-emitting unit 25 passes through the pervious unit 27 and reaches the display panel 24, so that the keyboard graphics are projected and displayed on the display panel 24.

The touch sensor 23 is a commonly known planar sensor, which is, for example a film resistance type sensor or a capacitance type sensor or the like.

The display panel 24 is a panel made by covering the surface of an acrylic resin substrate with a polarizing film, and protects the surface of the touch sensor 23.

Figure 6A:
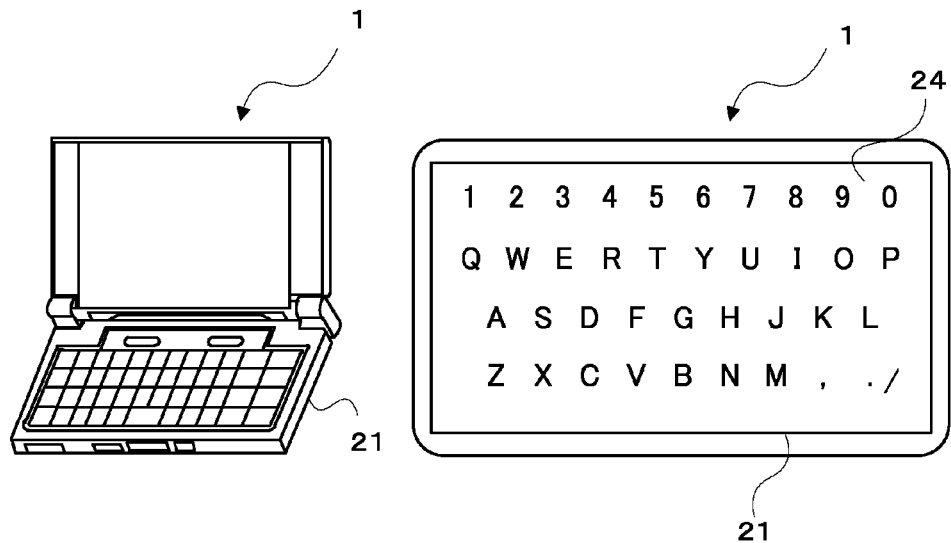
FIG. 6A shows a view of a keyboard graphics on the touch panel of the mobile phone handset in the first configuration according to the exemplary embodiment.
Figure 6B:
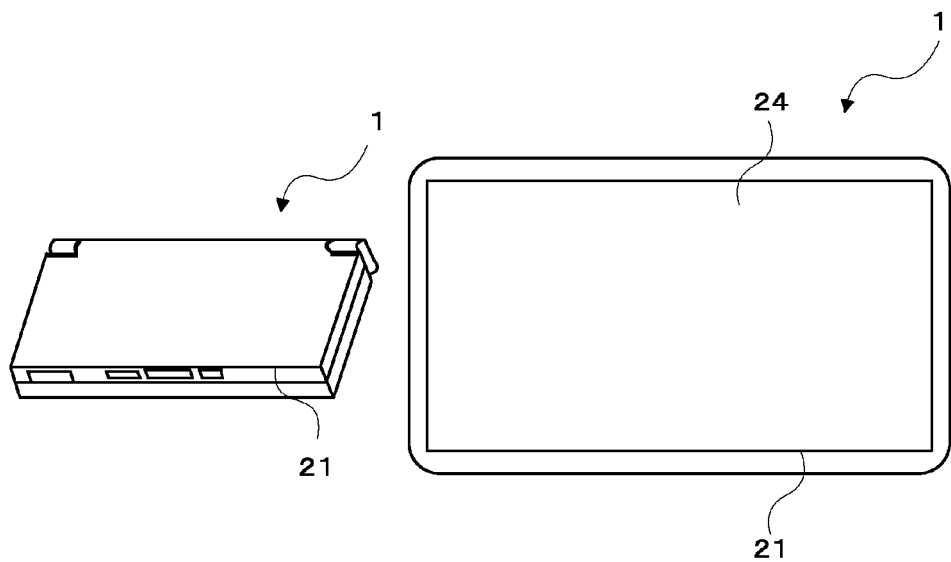
FIG. 6B shows a view of halting a keyboard graphics on the touch panel of the mobile phone handset in the second configuration according to the exemplary embodiment.

Because the touch panel 21 is thus composed, when the touch panel 21 functions as a so-called software keyboard, the light-emitting unit 25 emits light so that the keyboard graphics can be displayed on the display panel 24 (see FIG. 6A). When the touch panel 21 functions as an operation input unit for rear-surface operation, it is possible to halt the display of the keyboard graphics by halting the emission of light by the light-emitting unit 25 (see FIG. 6B).

In addition, it is possible to accomplish light emission or the halting of light emission by the light-emitting unit 25 under a command from the mode switching unit 40, and to accomplish the display or halting of the display of the keyboard graphic simultaneously with switching of the operating mode.

With the above-described exemplary embodiment, the mobile phone handset 1 is provided with a mode switching unit 40, and when the mobile phone handset 1 is in the first configuration, an operating mode is selected that causes the touch panel 21 to function as a keyboard, and when the mobile phone handset 1 is in the second configuration, an operating mode is selected that causes the touch panel 21 to function as an operation input unit for rear-surface operation. Through this, input by a keyboard or by operation input through rear-surface operation can be arbitrarily selected.

In addition, the mobile phone handset 1 causes the mode switching unit 40 to operate in accordance with the configuration of the mobile phone handset 1 detected by the configuration detection sensor 50. When the configuration detection sensor 50 detects that the mobile phone handset 1 is in the second configuration, the mode switching unit 40 causes the touch panel 21 to function as an operation input unit for rear-surface operation. Accordingly, the function of the touch panel 21 is automatically changed in accordance with the configuration of the mobile phone handset 1.

The above-described exemplary embodiment is a concrete exemplary aspect of the present invention and does not limit the technical scope of the present invention. The present invention may be implemented by freely altering, applying or varying such within the technical scope noted in the Scope of Claims.

For example, in the above-described exemplary embodiment, the configuration detection sensor 50 is the angular sensor that detects the open angle, but the configuration detection sensor 50 is not limited to the angular sensor. For example, a magnet may be attached to the first casing 10 and a magnetic sensor attached to the second casing 20 in order to detect the magnetic flux from the magnet may be used as the configuration detection sensor 50. When it is determined by signals from the magnetic sensor that the magnet is above the magnetic sensor, the mode switching unit 40 may halt the touch panel 21; when it is determined that magnetic flux from the magnet is not detected (the magnetic flux from the magnet is outside the detection range of the magnetic sensor), the touch panel 21 may be caused to function as a keyboard; and when it is determined that the magnet is below the magnetic sensor, the touch panel 21 may be caused to function as an operation input unit for rear-surface operation.

Or, pressure switches may be provided on the surface (inner surface) and rear surface on the touch panel 21 side of the second casing 20 and pressing pieces that press these pressure switches may be provided on the surface (inner surface) and rear surface of the display panel 11 of the first casing 10, and these switches may be used as the configuration detection switch 50. When the pressing piece makes contact with the pressure switch provided on the inner surface of the second casing 20 so that the pressure switch is pressed, the mode switching unit 40 receives a signal from the pressure switch and halts the touch panel 21. When neither of the pressure switches provided on the inner surface and the rear surface of the second casing 20 are pressed, the mode switching unit 40 causes the touch panel 21 to function as the keyboard. When the pressing piece makes contact with the pressure switch provided on the rear surface of the second casing 20 so that this pressure switch is pressed, the mode switching unit 40 receives a signal from that pressure switch and causes the touch panel 21 to function as the operation input unit for rear-surface operation.

In the above explanation, the first casing 10 and the second casing 20 are connected so as to be capable of rotation relative to each other, but the connection between the two is not limited to this example. The connection between the two may be any connection as long as the two can move relative to each other and can attain the first configuration and the second configuration.

Figure 7:
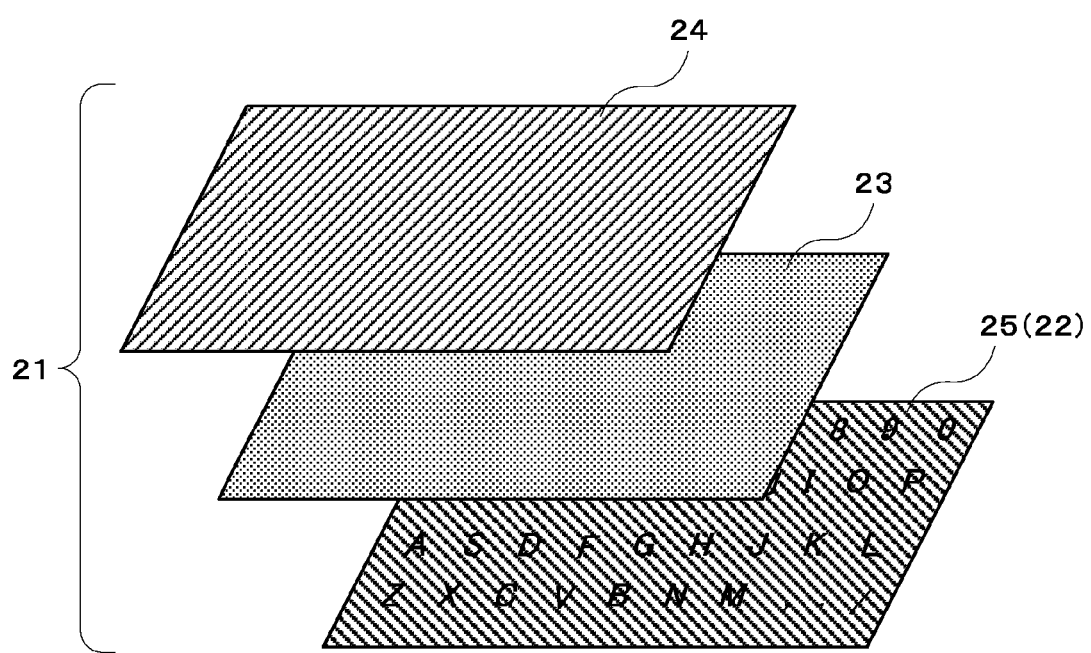
FIG. 7 is an oblique view showing another composition of the touch panel of the mobile phone handset according to the exemplary embodiment.

In addition, in the above-described exemplary embodiment, the example is shown in which the graphics display unit 22 is composed of the light-emitting unit 25 and the mask 26, but the composition of the graphics display unit 22 is not limited to this example. For example, as shown in FIG. 7 the light-emitting unit 25 may have LED elements arranged in the keyboard graphics shape on the panel. In this case, the mask 26 is unnecessary, so the number of components in the touch panel 21 can be reduced and in addition, because only the number of LED elements corresponding to the graphic portion of the keyboard is needed, the number can be reduced, thereby contributing to reduction of power consumption by the light-emitting unit 25.

In addition, the graphics display unit 22 is not limited to the type in which the light-emitting unit 25 is provided and the graphic of the keyboard is projected onto the display panel 24. The type and the composition of the graphics display unit 22 is not limited as long as the apparatus can display the shape of the keyboard on the touch panel 21 and halt this display as necessary, and may be an apparatus that is not equipped with the light-emitting unit 25. For example, the graphics display unit 22 may be a liquid crystal display apparatus.

In addition, the mode switching unit 40 does not necessarily need dedicated hardware (a computer). For example, the operating mode switching program 60 may be installed on the computer that controls the mobile phone handset 1 and that computer may function as the mode switching unit 40.

The mode switching unit 40 in the above-described exemplary embodiment may have a composition including a CPU (Central Processing Unit), or an MPU (Micro Processing Unit), RAM (Random Access Memory), ROM (Read Only Memory) or the like, and can be realized by running operating mode switching program 60 on the RAM or the ROM.

The operating mode switching program 60 that causes the mode switching unit 40 (the computer) to achieve the above-described functions may be recorded on a recording medium such as a CD-ROM (Compact Disc Read Only Memory), for example, and can be executed by having this operating mode switching program 60 read by the mode switching unit 40. As recording media for recording the above-described program, besides CD-ROM it is possible to use a DVD-ROM (Digital Versatile Disc Read Only Memory), a Blue-ray Disc, a flexible disk, a hard disk, a magnetic tape, a magneto-optical disc, a non-volatile memory card or the like.

In addition, not only are included in the exemplary embodiment of the present invention the supplied program (operating mode switching program 60) realizing the functions of the above-described exemplary embodiment by the computer executing the program, but also the supplied program realizing the functions of the above-described exemplary embodiment in cooperation with the OS (Operating System) or other application software running on the computer, or realizing the functions of the above-described exemplary embodiment by all or a portion of the processes of the program being executed by a function expansion board or function expansion unit of the computer, those programs are included in the exemplary embodiment of the present invention.

In addition, the mode switching unit 40 is not limited to one combining hardware (a computer) and software (programs). the mode switching unit 40 may be composed of hardware alone, for example a fixed logic circuit. In addition, the mode switching unit 40 may be a manual operation switch.

In addition, a switch that halts input operation of the touch panel 21 may be provided in the mobile phone handset 1. Through this, when keyboard input will not be accomplished for awhile or when the mobile phone handset 1 is transported, it is possible to prevent erroneous operation of the mobile phone handset 1 by operating this switch.

All or a portion of the above-described exemplary embodiment is noted in the appendices below, but this is not intended to be limiting.

(Appendix 1)

A mobile electronic device comprising a first casing provided with a display panel, and a second casing provided with a touch panel; and wherein the first casing and the second casing are connected so as to be capable of moving relative to each other, such that a first configuration in which the display panel and the touch panel are in the same field of vision and a second configuration in which the touch panel is positioned at the rear surface of the display panel can be attained;

and further comprising a mode switching unit for switching operating modes by determining whether the mobile electronic device is in the first configuration or the second configuration, and when the determinations result is the first configuration, selecting an operating mode that causes the touch panel to function as a keyboard, and when the determination result is the second configuration, selecting an operating mode that causes the touch panel to function as an operation input unit for rear-surface operation.

(Appendix 2)

The mobile electronic device according to Appendix 1, wherein:

the touch panel includes a graphics display unit for displaying keyboard graphics; and the mode switching unit causes the graphics display unit to operate when the determination result is the first configuration, and halts the graphics display unit when the determination result is the second configuration.

(Appendix 3)

The mobile electronic device according to Appendix 2, wherein:

the graphics display unit includes a light-emitting unit; and the mode switching unit controls the operation and halting of the graphics display unit by controlling light emission and the halting of light emission from the light-emitting unit.

(Appendix 4)

The mobile electronic device according to Appendix 1, further comprising a configuration detection sensor for detecting information relating to the configuration of the mobile electronic device;

wherein the mode switching unit determines the configuration on the basis of information detected by the configuration detection sensor.

(Appendix 5)

The mobile electronic device according to Appendix 4, wherein the mode switching unit causes the touch panel to function as an operation input unit for rear-surface operation when the mode switching unit determines that the mobile electronic device is in the second configuration based on information detected by the configuration detection sensor.

(Appendix 6)

A mobile electronic device comprising a first casing provided with a display panel, and a second casing provided with a touch panel; and wherein the first casing and the second casing are connected so as to be capable of moving relative to each other, such that a first configuration in which the display panel and the touch panel are in the same field of vision and a second configuration in which the touch panel is positioned at the rear surface of the display panel can be attained;

and further comprising a mode switching means for switching operating modes by determining whether the mobile electronic device is in the first configuration or the second configuration, and when the determinations result is the first configuration, selecting an operating mode that causes the touch panel to function as a keyboard, and when the determination result is the second configuration, selecting an operating mode that causes the touch panel to function as an operation input means for rear-surface operation.

(Appendix 7)

A method for switching operating modes, being the method for a mobile electronic device comprising a first casing provided with a display panel, and a second casing provided with a touch panel; and wherein the first casing and the second casing are connected so as to be capable of moving relative to each other, such that a first configuration in which the display panel and the touch panel are in the same field of vision and a second configuration in which the touch panel is positioned at the rear surface of the display panel can be attained;

the operating mode switching method comprising:

a determination step for determining whether the configuration of the mobile electronic device is the first configuration or the second configuration; and a mode switching step for switching the operating mode by selecting an operating mode that causes the touch panel to function as a keyboard when the result of the determination in the determination step is the first configuration, and selecting an operating mode that causes the touch panel to function as an operation input means for rear-surface operation when the result of the determination is the second configuration.

(Appendix 8)

A recording medium being a computer-readable recording medium recording an operating mode switching program for a mobile electronic device comprising a first casing provided with a display panel, and a second casing provided with a touch panel; and wherein the first casing and the second casing are connected so as to be capable of moving relative to each other, such that a first configuration in which the display panel and the touch panel are in the same field of vision and a second configuration in which the touch panel is positioned at the rear surface of the display panel can be attained;

the program recorded on the recording medium executing on a computer:

a determination step for determining whether the configuration of the mobile electronic device is the first configuration or the second configuration; and a mode switching step for switching the operating mode by selecting an operating mode that causes the touch panel to function as a keyboard when the result of the determination in the determination step is the first configuration, and selecting an operating mode that causes the touch panel to function as an operation input means for rear-surface operation when the result of the determination is the second configuration.

Having described and illustrated the principles of this application by reference to the preferred embodiment, it should be apparent that the preferred embodiment(s) may be modified in arrangement and detail without departing from the principles disclosed herein and that it is intended that the application be construed as including all such modifications and variations insofar as they come within the spirit and scope of the subject matter disclosed herein.

What is claimed is:

1. A mobile electronic device comprising a first casing provided with a display panel, and a second casing provided with a touch panel; and wherein the first casing and the second casing are connected so as to be capable of moving relative to each other, such that a first configuration in which the display panel and the touch panel are in the same field of vision and a second configuration in which the touch panel is positioned at the rear surface of the display panel can be attained;

and further comprising a mode switching unit for switching operating modes by determining whether the mobile electronic device is in the first configuration or the second configuration, and when the determinations result is the first configuration, selecting an operating mode that causes the touch panel to function as a keyboard, and when the determination result is the second configuration, selecting an operating mode that causes the touch panel to function as an operation input unit for rear-surface operation;

the touch panel includes a graphics display unit for displaying keyboard graphics; and the mode switching unit causes the graphics display unit to operate when the determination result is the first configuration, and halts the graphics display unit when the determination result is the second configuration; and the graphics display unit includes a light-emitting unit; and the mode switching unit controls the operation and halting of the graphics display unit by controlling light emission and the halting of light emission from the light-emitting unit.

2. The mobile electronic device according to claim 1, further comprising a configuration detection sensor for detecting information relating to the configuration of the mobile electronic device;

wherein the mode switching unit determines the configuration on the basis of information detected by the configuration detection sensor.

3. The mobile electronic device according to claim 2, wherein the mode switching unit causes the touch panel to function as an operation input unit for rear-surface operation when the mode switching unit determines that the mobile electronic device is in the second configuration based on information detected by the configuration detection sensor.

4. A method for switching operating modes, being the method for a mobile electronic device comprising a first casing provided with a display panel, and a second casing provided with a touch panel; and wherein the first casing and the second casing are connected so as to be capable of moving relative to each other, such that a first configuration in which the display panel and the touch panel are in the same field of vision and a second configuration in which the touch panel is positioned at the rear surface of the display panel can be attained;

said operating mode switching method comprising:

a determination step for determining whether the configuration of the mobile electronic device is the first configuration or the second configuration; and a mode switching step for switching the operating mode by selecting an operating mode that causes the touch panel to function as a keyboard when the result of the determination in said determination step is the first configuration, and selecting an operating mode that causes the touch panel to function as an operation input unit for rear-surface operation when the result of said determination is the second configuration;

wherein the touch panel includes a graphics display unit for displaying keyboard graphics, the mode switching step causes the graphics display unit to operate when the determination result is the first configuration, and halts the graphics display unit when the determination result is the second configuration, the graphics display unit includes a light-emitting unit, and the mode switching step controls the operation and halting of the graphics display unit by controlling light emission and the halting of light emission from the light-emitting unit.

5. A recording medium being a non-transitory computer-readable recording medium recording an operating mode switching program for a mobile electronic device comprising a first casing provided with a display panel, and a second casing provided with a touch panel; and wherein the first casing and the second casing are connected so as to be capable of moving relative to each other, such that a first configuration in which the display panel and the touch panel are in the same field of vision and a second configuration in which the touch panel is positioned at the rear surface of the display panel can be attained;

said program recorded on said recording medium executing on a computer:

a determination step for determining whether the configuration of the mobile electronic device is the first configuration or the second configuration; and a mode switching step for switching the operating mode by selecting an operating mode that causes the touch panel to function as a keyboard when the result of the determination in said determination step is the first configuration, and selecting an operating mode that causes the touch panel to function as an operation input unit for rear-surface operation when the result of said determination is the second configuration;

wherein the touch panel includes a graphics display unit for displaying keyboard graphics, the mode switching step causes the graphics display unit to operate when the determination result is the first configuration, and halts the graphics display unit when the determination result is the second configuration, the graphics display unit includes a light-emitting unit, and the mode switching step controls the operation and halting of the graphics display unit by controlling light emission and the halting of light emission from the light-emitting unit.

* * * * *